US008881095B1

(12) United States Patent
Hunt, Jr. et al.

(10) Patent No.: US 8,881,095 B1
(45) Date of Patent: Nov. 4, 2014

(54) SOFTWARE DEFECT PREDICTION

(75) Inventors: Billy Edward Hunt, Jr., Overland Park, KS (US); Jennifer J. Kirkpatrick, Olathe, KS (US); Richard Allan Kloss, Fort Myers, FL (US); William Joseph Schmitt, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 258 days.

(21) Appl. No.: 13/436,487

(22) Filed: Mar. 30, 2012

(51) Int. Cl.
*G06F 9/44* (2006.01)
*G06Q 10/00* (2012.01)

(52) U.S. Cl.
USPC ......... 717/102; 717/101; 705/7.13; 705/7.17; 705/7.21

(58) Field of Classification Search
None
See application file for complete search history.

(56) References Cited

U.S. PATENT DOCUMENTS 6,073,107 A * 6/2000 Minkiewicz et al. ........ 705/7.17
6,477,471 B1 * 11/2002 Hedstrom et al. .............. 702/34
6,519,763 B1 * 2/2003 Kaufer et al. ................. 717/101
7,146,608 B1 * 12/2006 Newman et al. .............. 717/168
7,328,202 B2 * 2/2008 Huang et al. .................... 706/52
7,398,510 B2 * 7/2008 Lake ............................. 717/101
7,640,537 B2 * 12/2009 Simkins ........................ 717/126
7,856,616 B2 * 12/2010 Chang et al. .................. 717/101
8,024,303 B2 * 9/2011 Roehrle et al. ................ 707/694
8,074,204 B2 * 12/2011 Comstock et al. ............ 717/125
8,230,265 B2 * 7/2012 Rajashekara et al. ........ 714/38.1
8,296,724 B2 * 10/2012 Lindley ......................... 717/104
8,352,904 B2 * 1/2013 Hodges ......................... 717/101
8,370,798 B2 * 2/2013 Broadfoot et al. ............ 717/107
8,463,760 B2 * 6/2013 Himstedt et al. .............. 707/694
8,549,483 B1 * 10/2013 Bridges et al. ................ 717/126
2005/0071807 A1 * 3/2005 Yanavi .......................... 717/104
2005/0172269 A1 * 8/2005 Johnson et al. ............... 717/124
2006/0123389 A1 * 6/2006 Kolawa et al. ................ 717/101
2007/0168918 A1 * 7/2007 Metherall et al. ............. 717/101
2008/0082957 A1 * 4/2008 Pietschker et al. ............ 717/101
2008/0263507 A1 * 10/2008 Chang et al. .................. 717/104
2009/0043631 A1 * 2/2009 Finlayson et al. ................ 705/9
2010/0235807 A1 * 9/2010 Doddappa et al. ............ 717/101
2010/0251027 A1 * 9/2010 Yawalkar et al. ............... 714/38
2013/0311968 A1 * 11/2013 Sharma ......................... 717/101

* cited by examiner

*Primary Examiner* — Isaac T Tecklu
*Assistant Examiner* — Hossain Morshed

(57) ABSTRACT

A method of software defect prediction by a computer is provided. The method comprises identifying software test organizations scheduled to perform testing on an application or applications, where the scope of the software testing varies between different test organizations, identifying the type of test cases to be executed by each test organization, where the test types comprise at least one of new functionality test and regression test, and identifying a planned number of test cases to be executed for each test type. A forecast number of defects are modeled by a computer based on the planned number of test cases to be executed and a defect rate for each test type. The development staffing level capable of fixing forecast defects by the scheduled completion of testing is calculated by the computer based on a fix capacity of a software development organization. Development resources are assigned to fix defects based on the calculated development staffing level.

20 Claims, 4 Drawing Sheets

SOFTWARE DEFECT PREDICTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software testing is the process of validating and verifying that a software program or application meets the requirements that guided its design and development and works as expected. Software testing can be implemented at any time in the software development process, but most of the effort typically occurs after the requirements have been defined and the coding process has been completed. Software testing results in the identification of defects in the software application to allow the defects to be corrected before the application is released to users.

A software defect describes an error, failure, or fault in a computer program or system that produces an incorrect or unexpected result, or causes it to behave in unintended ways. Most defects arise from mistakes made by people in either a program's source code or its design. Defects trigger errors that in turn can have a wide variety of effects with varying levels of inconvenience to the user of the program.

SUMMARY

In an embodiment, a method of performing software defect prediction by a computer is disclosed. The method comprises identifying software test organizations scheduled to perform testing on an application or applications, where the scope of the software testing varies between different test organizations, identifying the type of test cases to be executed by each test organization, where the test types comprise at least one of new functionality test and regression test, and identifying a planned number of test cases to be executed for each test type. A forecast number of defects are modeled by a computer based on the planned number of test cases to be executed and a defect rate for each test type. The development staffing level capable of fixing forecast defects by the scheduled completion of testing is calculated by the computer based on a fix capacity of a software development organization. Development resources are assigned to fix defects based on the calculated development staffing level.

In an embodiment, a method of performing software defect prediction by a computer is disclosed. The method comprises identifying software test organizations scheduled to perform testing on an application or applications, where the scope of the software testing varies between different test organizations, identifying the type of test cases to be executed by each test organization, where the test types comprise at least one of new functionality test and regression tests, and identifying a planned number of test cases to be executed for each test type. A forecast number of defects are modeled by a computer based on the planned number of test cases to be executed and a defect rate for each test type. A test staffing level capable of executing test cases by the scheduled completion of testing is calculated by the computer based on a test execution capacity of the software test organizations. Test resources are assigned to execute test cases based on the calculated staffing level.

In an embodiment, a method of performing software defect prediction by a computer is disclosed. The method comprises identifying software test organizations scheduled to perform testing on an application or applications, where the scope of the software testing varies between different test organizations, identifying the type of test cases to be executed for each test organization, where the test types comprise at least one of new functionality test and regression tests, and identifying a planned number of test cases to be executed for each test type. A forecast number of defects are modeled by a computer based on the planned number of test cases to be executed and a defect rate for each test type. A defect backlog is modeled by a computer and a determination is made on whether to include the software application under test into production based on the forecast number of defects remaining at the completion of a testing schedule.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
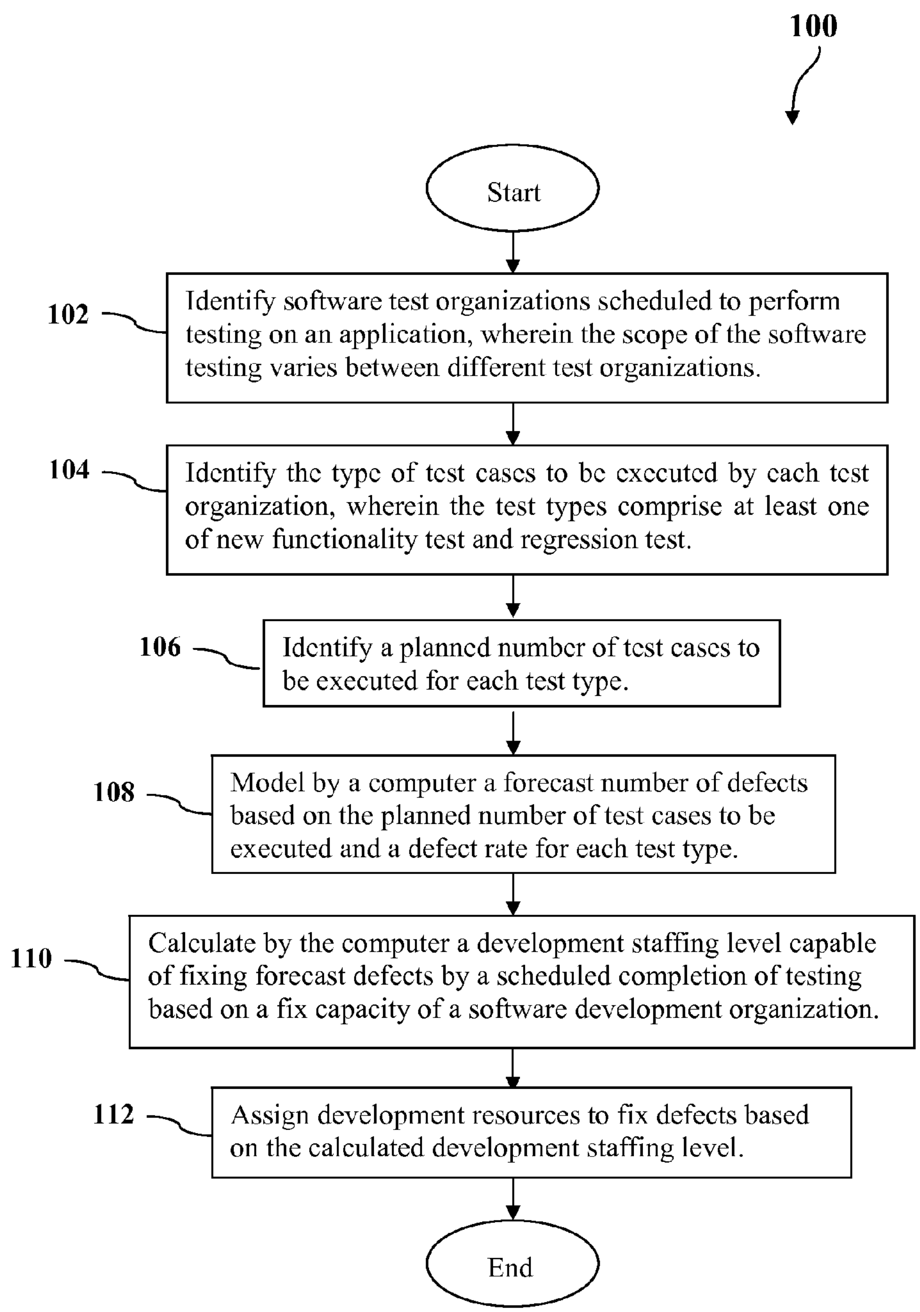
FIG. 1 is a flow chart of a method on a computer of software defect prediction according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Large enterprise software development application releases may span many months of development with many lines of code written and modified. Testing these enterprise applications may also take months of effort to execute tens of thousands of test cases, resulting in thousands of software defects being found. As defects are discovered, they may impact other test cases that involve the same area of the software or similar functionality. The impacted test cases may be blocked from execution until the defects are fixed. Scheduling the test resources for a large enterprise application is complicated by the discovered defects blocking test case availability and having sufficient development resources allocated to quickly resolve the defects. The disclosed method analyzes historical data from previous testing projects and the planned test case execution schedule to model by a computer the expected number of defects to be found and the impacts of the discovered defects on the test schedule, providing forecasts that can be used to sufficiently staff the project and to make decisions on releasing the application into production at the completion of the testing schedule.

A method of performing software defect prediction by a computer is disclosed, providing the ability to model and forecast test case execution and the number of defects expected to be found during testing. The method may then be used to calculate by the computer the development staffing level required to fix the forecast number of defects and to allocate the development resources to the project based on the calculated development staffing level. The method may additionally be used to calculate by the computer the test staffing level required to execute all test cases by the scheduled completion of testing and to allocate the test resources to the project based on the calculated test staffing level. The method may also be used to recursively re-plan the schedule by the computer on a weekly basis during the test schedule utilizing the actual number of tests executed and defects found to adjust the calculated forecasts. Adjusting the schedule weekly enables the organization to respond to a backlog of defects that may accumulate over the course of the testing and to make a determination about whether to release the software application under test into production based on the backlog of defects.

The forecast number of defects may be based, for example on a defect rate determined using historical data comprising the number of defects found for every 100 test cases executed. This defect rate may vary based on the test organization, for example enterprise test or user acceptance test, and the test type, such as new functionality testing or regression testing. The defect rate varies based on the number of test execution cycles, for instance the defect rate is higher on the first test execution pass than it would be on subsequent test execution passes as defects will be found in the first pass and will be fixed prior to subsequent passes. The method utilizes the defect rate and the planned test case execution numbers to model by a computer the forecast number of defects during each week of a test schedule.

In addition to modeling the forecast number of defects, the disclosed method uses historical data to calculate a defect fix rate, a defect fix failure rate, a fix capacity, and a gating defect rate. Using these calculated values, the method models a defect backlog, a forecast number of gating defects, a gating defect backlog, a number of defects fixed per week, and a number of gating defects fixed per week. Similarly, on the test execution side, the method can model by the computer a forecast number of test cases executed as well as a forecast number of blocked test cases, deferred test cases, weekly test case availability, and overflow test cases.

The method describes modeling the forecast values on a weekly basis and using the values from previous weeks as inputs to model following weeks. This allows the model to show accumulative data forecasts to provide a picture of the forecast status of testing across the scheduled timeline. The data can also be updated with actual results as test cases are executed and the model can adapt the forecasts based on these actual results. The updated weekly forecasts may show that the testing is behind schedule due to a backlog of defects waiting to be fixed and justify increasing the software development staff working on fixing defects. The weekly forecasts may also allow advanced planning on the readiness of the application to be released into production and the impacts of remaining defects on the release.

Turning now to FIG. 1, a method 100 of performing software defect prediction by a computer is described. An exemplary computer system suitable for the described embodiments is presented in FIG. 4 and described in detail below. At block 102, software test organizations scheduled to perform testing on an application or applications are identified, where the scope of the software testing varies between different test organizations. Different test organizations may test an application at different points in the development cycle and with different test objectives, for example functional testing versus usability testing or performance testing, where a load is put on the application to determine responsiveness and stability. At block 104, the type of test cases to be executed by each test organization is identified, where the test types comprise at least one of new functionality test and regression test. New functionality tests are designed to verify that a new feature is implemented correctly and performs according to the requirements. Regression tests are tests that were developed to test existing features to ensure that the changes made to implement new features do not impact existing functionality. At block 106, a planned number of test cases to be executed for each test type are identified. Each test organization identifies the number of test cases they plan to execute during the test schedule and the number of test cases of each test type. At block 108, a forecast number of defects are modeled by a computer based on the planned number of test cases to be executed and a defect rate for each test type. The defect rate varies based on the test type. For example, because regression tests are testing functionality that already existed in previous versions of the software application, the defect rate may be lower than the defect rate of new functionality tests which are testing newly developed features that have not been tested previously.

At block 110, a development staffing level capable of fixing all forecast defects by a scheduled completion of testing is calculated by the computer based on a fix capacity of a software development organization. The fix capacity of the software development organization is calculated by the computer based on the rate of fixes for the software development organization on previous applications or releases. The fix capacity and the forecast number of defects can be used to calculate the development staffing level required to fix all forecast defects by the end of the testing schedule. At block 112, development resources are assigned to fix defects based on the calculated development staffing level. The appropriate level of development resources may then be assigned to fix defects to ensure the application is ready for deployment to production.

In an embodiment, the scope of the software testing comprises at least one of functionality testing and user acceptance testing. Functional testing refers to testing that verifies a specific action or function of the code is successful, for instance, does this particular feature work as defined according to a specification document or a requirements document. User acceptance may include some functional testing, but also includes looking at non-functional areas such as usability, performance, and reliability and may be more subjective in nature. User acceptance testing may be focused on verifying the application will benefit the users and add business value, such as making tasks easier to accomplish and increasing efficiency.

In an embodiment, the method 100 further comprises analyzing historical data comprising the number of defects found in software deliverables per every one hundred test cases executed to determine the defect rate. The defect rate refers to the percentage of defects found based on analyzing data from past software testing projects. The defect rate is also a function of the test organization executing the test cases and the test type, and the method 100 takes these varying defect rates into consideration when modeling the forecast number of defects. The planned test cases to be executed are identified by test organization and test type and multiplied by the associated defect rate to forecast the number of defects. In an embodiment, the software development organization and/or the software application under test may also be analyzed by the computer when determining the defect rate. The complexity of the application, the number of applications affected, and the historical performance of the software development group may affect the defect rate in addition to the test organization and test type.

In an embodiment, the method 100 further comprises analyzing historical data comprising the number of defects fixed per week per software developer to determine the fix capacity of the software development organization. The fix capacity is based on the number of development resources assigned to fix defects and the historical rate at which the software developers produce fixes. The fix capacity provides a view of the number of fixes that can be completed based on the currently assigned development resources and can be used in modeling the forecast defects resolved over the duration of the test schedule.

In an embodiment, the method 100 further comprises modeling defects that require multiple fixes and including the additional defects in the forecast number of defects. Based on historical analysis of fixes from previous software testing projects, a failure rate of fixes can be determined based on the number of defects that are not fixed on the first attempt. This fix failure rate can be used in modeling the forecast number of defects to include the additional failures as additional defects in the forecast to more accurately calculate the development resources required to fix all forecast defects by the scheduled completion of testing. The historical analysis may additionally factor in the experience and skill levels of software developers when determining the fix failure rate and the fix capacity of the software development organization. In an embodiment, different fix rates and/or different fix failure rates may be determined for each of a plurality of different skill levels. For example, a first fix rate may be determined for a junior developer skill level, a second fix rate may be determined for an associate developer skill level, and a third fix rate may be determined for a senior developer skill level. Likewise, a first fix failure rate may be determined for the junior developer skill level, a second fix failure rate may be determined for the associate developer skill level, and a third fix failure rate may be determined for the senior developer skill level. In another embodiment, a different stratification of skill levels of developers may be employed.

In an embodiment, the method 100 further comprises modeling a defect backlog, where the defect backlog is the number of defects remaining after subtracting the number of fixes. The defect backlog is a composite look at the remaining defects after accounting for fixes. The defect backlog is modeled by the computer over the duration of the test schedule, typically on a weekly basis, to provide a view of the testing status with regards to outstanding defects. Modeling the defect backlog on a weekly basis can show a forecast of when in the test schedule the backlog may become too large to overcome, and may suggest that more development resources are needed to address the defects. The goal is to reduce the defect backlog to zero by the end of the testing schedule.

In an embodiment, the method 100 further comprises modeling the forecast number of gating defects based on the total forecast number of defects, where gating defects are defects which block the application from delivery into production. The rate of gating defects is determined by analyzing historical data for the number of gating defects found compared to the total number of defects found. Using this gating defect rate, the forecast number of gating defects can be modeled based on the total forecast number of defects. Due to the severity of gating defects, they are modeled by the computer separately as all gating defects must be fixed for the application to be released into production.

In an embodiment, the forecast number of blocking defects is modeled based on the total forecast number of defects, where blocking defects are defects which block test cases from being executed as scheduled. The scheduled test cases would fail based on the known blocking defect, and are therefore withheld from execution until the blocking defect is fixed. The rate of blocking defects is determined by analyzing historical data for the number of blocking defects found compared to the total number of defects found. The forecast number of blocking defects can be modeled based on the total forecast number of defects and the blocking defect rate. The blocking defect rate may take into account the level of complexity of the subject application or applications under test and/or the number of interfaces to other applications.

In an embodiment, historical data comprising a gating defect backlog and a number of gating defects fixed per week is analyzed to determine a gating defect fix rate. The gating defect backlog is the number of gating defects remaining after subtracting the number of gating defects fixed. The gating defect fix rate is determined by analyzing the number of gating defects fixed in a week compared to the gating defect backlog entering the week. In an embodiment, a forecast number of gating defects fixed per week is modeled based on a gating defect backlog at the start of a week and the determined gating defect fix rate. The gating defect backlog can be calculated each week and multiplied by the gating defect fix rate to determine a forecast number of gating defects fixed for the week. This can be modeled along with the gating defect backlog to show the expected progression of the gating defects over the duration of the test schedule.

Figure 2:
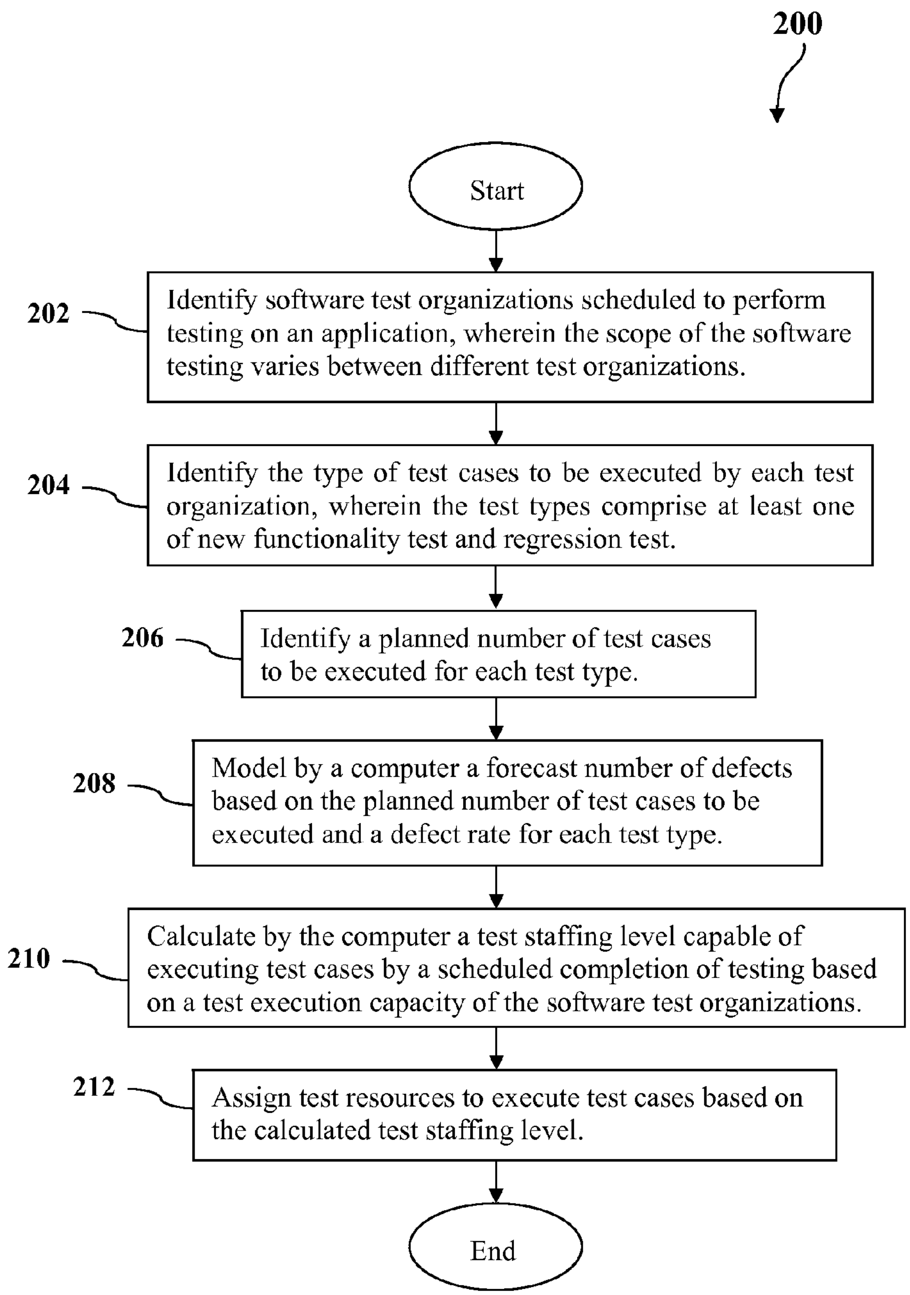
FIG. 2 is a flow chart of a method on a computer of software defect prediction according to an embodiment of the disclosure.

Turning now to FIG. 2, a method 200 of performing software defect prediction using a computer is described. At block 202, software test organizations scheduled to perform testing on an application are identified, where the scope of the software testing varies between different test organizations. Different test organizations may have differing objectives when testing an application, such as functional testing as opposed to usability testing. At block 204, the type of test cases to be executed for each test organization is identified, where the test types comprise at least one of new functionality test and regression test. Each test organization may perform new functionality testing and regression testing. Although a user acceptance test organization may look at broader usability features than an enterprise test organization looking at core functionality, both may still perform both test types but with different test objectives. At block 206, a planned number of test cases to be executed for each test type are identified. Each test organization involved in testing the application or applications identifies the number of test cases of each test type they plan to execute.

At block 208, a forecast number of defects are modeled by a computer based on the planned number of test cases to be executed and a defect rate for each test type. The defect rate for each test type and test organization is multiplied by the planned number of test cases and the result is modeled by the computer over the duration of the testing schedule. At block 210, a test staffing level capable of executing all test cases by a scheduled completion of testing is calculated by the computer based on a test execution capacity of the software test organizations. The test execution capacity of the test organizations is calculated by a computer based on the rate of test execution on previous test cycles. At block 212, test resources are assigned to execute test cases based on the calculated test staffing level. The appropriate level of test resources may then be assigned to execute test cases to ensure the application testing is complete in time for deployment to production. In an embodiment, the scope of the software testing comprises at least one of functionality testing and user acceptance testing.

In an embodiment, the method 200 further comprises modeling a forecast number of blocked test cases, deferred test cases, weekly test case availability, and overflow test cases based on the planned number of tests to be executed, the forecast number of defects, and the test execution capacity of the software test organizations. In addition to modeling the forecast number of defects, other test data points may be modeled by a computer to provide greater understanding of the test schedule and to more closely predict the testing outcome. Blocked test cases are test cases that would fail based on a known defect and are therefore blocked from execution until the defect is fixed. Deferred test cases are previously blocked test cases that are now available for testing. The weekly test case availability is calculated based on the forecast weekly number of test cases executed plus the number of deferred test cases that are now available for testing. The overflow is the number of test cases from the weekly test case availability that exceed the test execution capacity of the software test organizations and will therefore have to be tested later in the test schedule.

In an embodiment, calculating the test staffing level capable of executing all test cases by the scheduled completion of testing is based on changes to forecast weekly test cases executed based on forecast schedule impacts due to blocked test cases, deferred test cases, weekly test case availability, and overflow test cases. Modeling these additional test data points helps in accounting for the dynamic changes that take place during the testing and building them into the schedule to ensure the test staffing level is sufficient to complete the testing by the end of the test schedule.

In an embodiment, the method 200 further comprises the software testing organizations executing a second pass of the new functionality test cases, where the defect rate for the second pass is lower than defect rate for the first pass based on analysis of historical data. Due to the expected number of defects found in testing an enterprise application, it is beneficial to perform the new functionality test cases a second time. This ensures that no defects were missed in the first pass, and also tests that any defects fixed during the first pass have not introduced new problems. Because many of the defects will have been found and fixed in the first pass of the new functionality test cases, the defect rate should be lower in the second pass. The historical data from previous testing is analyzed to determine the defect rate for the second pass and is incorporated into the model to forecast the number of defects.

Figure 3:
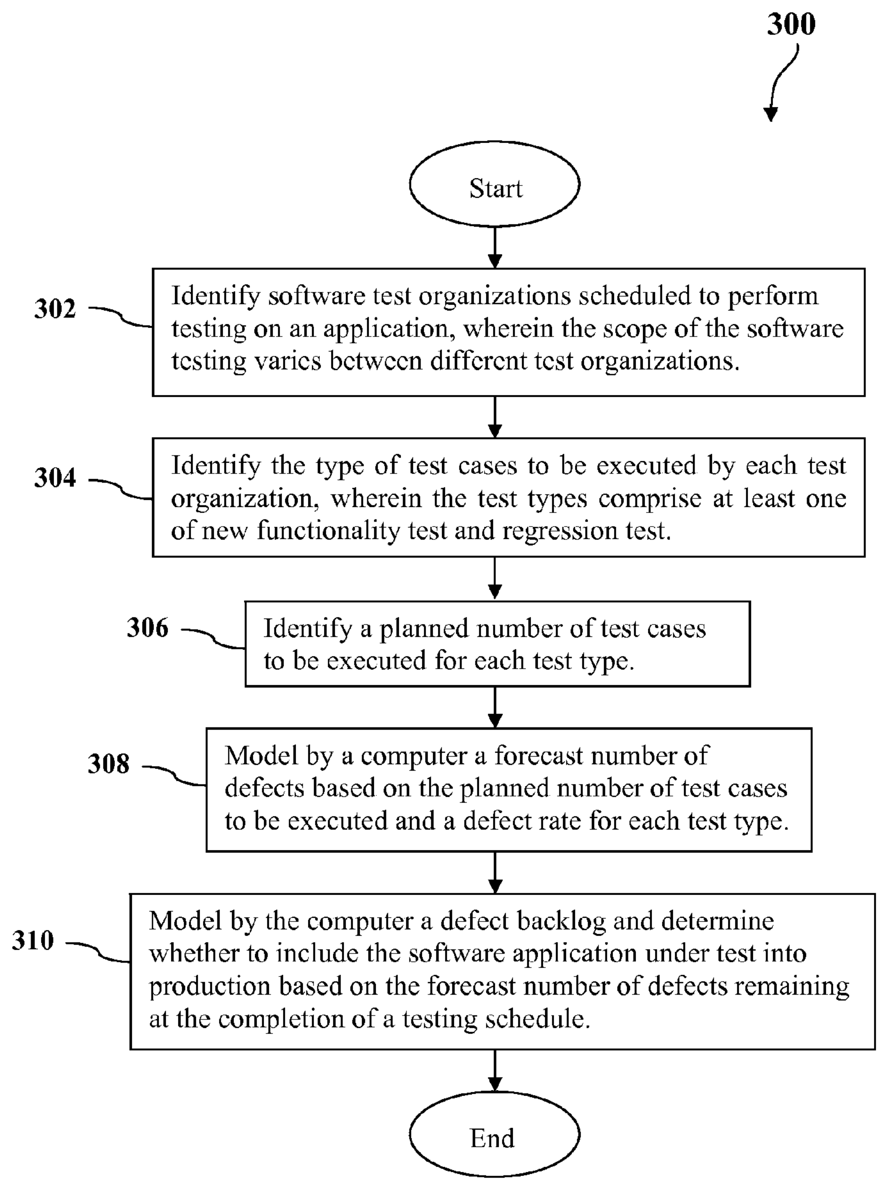
FIG. 3 is a flow chart of a method on a computer of software defect prediction according to an embodiment of the disclosure.

Turning now to FIG. 3, a method 300 of performing software defect prediction by a computer is described. At block 302, software test organizations scheduled to perform testing on an application or applications are identified, where the scope of the software testing varies between different test organizations. Different test organizations may test an application at different points in the development cycle and with different test objectives, for example functional testing versus usability testing or performance testing. At block 304, the type of test cases to be executed by or each test organization is identified, where the test types comprise at least one of new functionality test and regression test. Each test organization may perform both types of tests, but are still testing different areas of the application because of the different test objectives between their organizations. At block 306, a planned number of test cases to be executed for each test type are identified. Each test organization identifies the number of test cases for each test type that they plan to execute. At block 308, a forecast number of defects are modeled by a computer based on the planned number of test cases to be executed and a defect rate for each test type. The defect rates vary for each test type and test organization and are based on data from previous application test execution results. At block 310, the defect rate is modeled by the computer and a determination is made whether to include the software application under test into production based on the forecast number of defects remaining at the completion of a testing schedule. The forecast number and severity of defects remaining at the end of the test schedule may be evaluated and used to determine if the application is ready to be put into production.

In an embodiment, the method 300 further comprises modeling the defect backlog weekly during the testing schedule. The defect backlog is the number of defects remaining based on new defects found after accounting for defect fixes that have been released. For example, at the beginning of the testing schedule, the defect backlog may start at 0, or the application may have defects remaining to be fixed from a previous release. As new defects are discovered during testing, the number of new defects is added to the defect backlog. As defects are fixed by the software development organization, the number of fixed defects is subtracted from the defect backlog. The defect backlog may be modeled by the computer weekly to help ensure that the appropriate number of development resources is allocated to reduce the backlog to accommodate the testing schedule.

In an embodiment, the method 300 further comprises reducing the scope of a software deployment based on the forecast number of defects remaining at the completion of the testing schedule. Software deployment is the process of making the application or applications available for use. In addition to blocking the release of the application into production when the number of defects is too high at the completion of the testing schedule, it may be decided to release the application to a limited number of users. Reducing the scope of the user base may allow for proper training and alerting the user of the remaining defects, which may not be possible with a release to the full user base. Enhanced support for the smaller user base may be provided for a limited time until the defect backlog is reduced.

In an embodiment, the defects are classified by priority, and the determination to release the software application under test into production is based in part on the priority of the defects in the defect backlog. The defects may be prioritized by severity of the impact to the functionality of the application and the impact to the users. For instance, a typographical error on a user interface may be considered a low priority defect because it does not impact the functionality of the application, while a defect that causes the application to make an incorrect calculation may be a high priority defect. A small number of high priority defects, for instance more than 10, may be determined to be sufficient to prevent the release of the application into production, while it may take more than 100 low priority defects to block the release of the application into production. Alternatively, the threshold to block the release may not be on a single priority, but a cumulative total of high, medium, and low priority defects in the defect backlog.

In an embodiment, the method 300 further comprises modeling a forecast number of gating defects, where the software application under test may not be released into production with gating defects present. A gating defect is a defect which is determined to be significant enough on its own to prevent the application from being released into production. For example, a high priority defect which causes the application to stop functioning and close may be considered a gating defect and would prevent the application from being released into production even if it was the only defect remaining.

In an embodiment, determining whether to release the software application into production is based on user acceptance testing meeting pre-defined exit criteria. Exit criteria are the minimum conditions under which the software application is considered to meet acceptable operating specifications to continue to the next phase of the software life cycle. User acceptance testing is normally the final phase of testing before the application is released into production and meeting the exit criteria means the application is ready to exit the testing phase of the software life cycle. A test specification may be written to document the requirements to be satisfied by the testing phase and may detail the specific exit criteria for testing to be considered complete, which may include defining a number of defects and their priorities that are allowed to be carried into production. The method 300 may be used to model the number of defects to plan to meet the exit criteria as opposed to planning on reducing the defects to zero.

Figure 4:
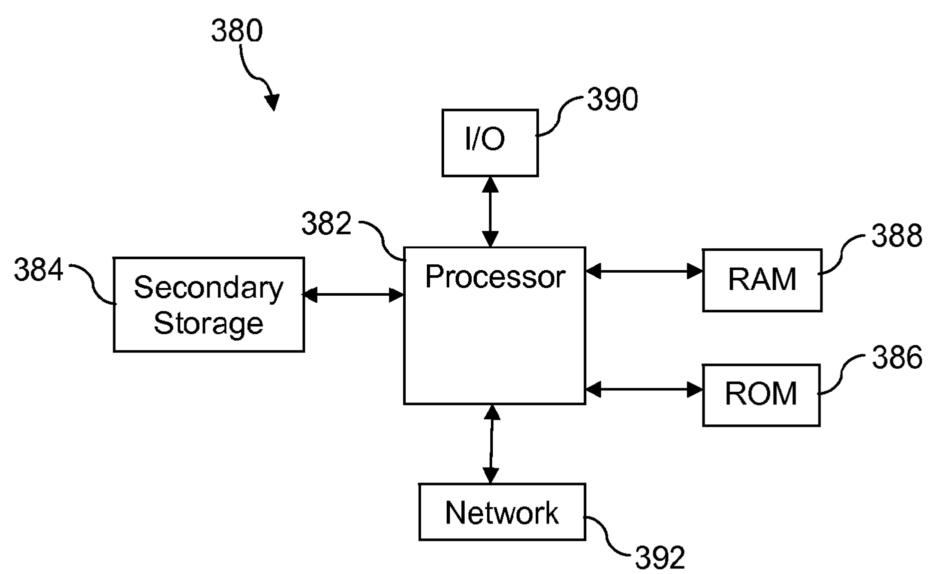
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of software defect prediction by a computer, comprising:

identifying software test organizations scheduled to perform testing on an application, wherein the scope of the software testing varies between different test organizations;

identifying the type of test cases to be executed by each test organization, wherein the test types comprise a new functionality test type that verifies that a new feature is implemented correctly and performs according to requirements and a regression test type that tests existing features to ensure that changes made to implement new features do not impact existing functionality;

identifying a planned number of test cases to be executed for each test type;

modeling, by a computer, a forecast number of defects based on the planned number of test cases to be executed for each test type and a defect rate for each test type, wherein the defect rate for the new functionality test type varies from the defect rate for the regression test type, and wherein the forecast number of defects represents a total number of defects expected to be found during the planned number of test cases to be executed for each test type;

calculating, by the computer, the development staffing level capable of fixing the forecast number of defects by the scheduled completion of testing based on a fix capacity of a software development organization;

assigning development resources to fix defects based on the calculated development staffing level; and fixing, by the development resources, at least a portion of the defects.

2. The method of claim 1, wherein the scope of the software testing comprises at least one of functionality testing and user acceptance testing.

3. The method of claim 1, wherein the defect rate for each test case is determined by analyzing historical data comprising the number of defects found in software deliverables per every one hundred test cases executed.

4. The method of claim 1, wherein the fix capacity of the software development organization is determined by analyzing historical data comprising the number of defects fixed per week per software developer.

5. The method of claim 1, further comprising modeling defects that require multiple fixes and including the additional defects in the forecast number of defects.

6. The method of claim 1, further comprising modeling a defect backlog, wherein the defect backlog is the number of defects of the forecast number of defects remaining after subtracting a number of fixes.

7. The method of claim 1, further comprising modeling a forecast number of gating defects based on the forecast number of defects, wherein gating defects are defects which block the application from delivery into production.

8. The method of claim 7, further comprising analyzing historical data comprising a number of gating defects fixed per week and a gating defect backlog to determine a gating defect fix rate.

9. The method of claim 8, further comprising modeling a forecast number of gating defects fixed per week based on a gating defect backlog at the start of a week and the determined gating defect fix rate.

10. A method of software defect prediction by a computer, comprising:

identifying software test organizations scheduled to perform testing on an application, wherein the scope of the software testing varies between different test organizations;

identifying the type of test cases to be executed by each test organization, wherein the test types comprise a new functionality test type that verifies that a new feature is implemented correctly and performs according to requirements and a regression test type that tests existing features to ensure that changes made to implement new features do not impact existing functionality;

identifying a planned number of test cases to be executed for each test type;

modeling, by a computer, a first forecast number of defects based on the planned number of test cases to be executed for each test type and a defect rate for each test type, wherein the defect rate for the new functionality test type varies from the defect rate for the regression test type;

calculating, by the computer, a test staffing level capable of executing the planned test cases by the scheduled completion of testing based on a test execution capacity of the software test organizations;

assigning test resources to execute test cases based on the calculated test staffing level;

executing a portion of the planned number of test cases;

determining an actual number of defects found in the portion of the planned number of test cases executed;

modeling, by a computer, a second forecast number of defects based on the planned number of test cases, the defect rate for each test type, the portion of the planned number of test cases executed, and the actual number of defects found in the portion of the planned number of test cases executed;

adjusting the test staffing level based on the second forecast number of defects and a test execution capacity of the software test organizations;

calculating, by the computer, a second test staffing level capable of executing a remaining portion of the planned test cases by the scheduled completion of testing based on the adjusted test staffing level; and assigning test resources to execute test cases based on the calculated second test staffing level.

11. The method of claim 10, wherein the scope of the software testing comprises at least one of functionality testing and user acceptance testing.

12. The method of claim 10, further comprising modeling a forecast number of blocked test cases, deferred test cases, weekly test case availability, and overflow test cases based on the planned number of test cases to be executed, the forecast number of defects, and the test execution capacity of the software test organizations.

13. The method of claim 12, wherein calculating the second test staffing level required is based on changes to forecast weekly test cases executed based on forecast schedule impacts due to blocked test cases, deferred test cases, weekly test case availability, and overflow test cases.

14. The method of claim 12, further comprising the software testing organizations executing a second pass of the new functionality test cases, wherein the defect rate for the second pass is lower than the defect rate for the first pass based on analysis of historical data.

15. A method of software defect prediction by a computer, comprising:

identifying software test organizations scheduled to perform testing on an application, wherein the scope of the software testing varies between different test organizations;

identifying the type of test cases to be executed by each test organization, wherein the test types comprise a new functionality test type that verifies that a new feature is implemented correctly and performs according to requirements and a regression test type that tests existing features to ensure that changes made to implement new features do not impact existing functionality;

identifying a planned number of test cases to be executed for each test type;

modeling, by a computer, a forecast number of defects based on the planned number of test cases to be executed for each test type and a defect rate associated with each test type, wherein the defect rate associated with the new functionality test type varies from the defect rate associated with the regression test type;

executing a portion of the planned number of test cases;

identifying a plurality of identified defects based on executing the portion of the planned number of test cases;

fixing at least a portion of the plurality of identified defects;

modeling, by the computer, a defect backlog, wherein the defect backlog is the number of defects of the forecast number of defects remaining after subtracting the portion of the plurality of identified defects that are fixed; and determining whether to release the application under test into production based on the number of defects of the forecast number of defects remaining at the completion of a testing schedule.

16. The method of claim 15, further comprising modeling the defect backlog weekly during the testing schedule.

17. The method of claim 16, further comprising reducing the scope of a software deployment based on the forecast number of defects of the forecast number of defects remaining at the completion of the testing schedule.

18. The method of claim 15, further comprising classifying the defects in the defect backlog by priority, wherein the determination to release the application is based in part on the priority of the defects in the defect backlog.

19. The method of claim 15, further comprising modeling a forecast number of gating defects, wherein the application under test cannot be released into production with gating defects present.

20. The method of claim 15, wherein determining whether to release the application into production is based on user acceptance testing meeting pre-defined exit criteria.

* * * * *